United States Patent Office 3,481,848
Patented Dec. 2, 1969

3,481,848
RADIATION GRAFT POLYMERIZATION OF VINYL COMPOUNDS ONTO CELLULOSE IN AN EMULSION SYSTEM
Masao Gotohda, Takasaki-shi, Hiroshi Kubota, Koganei-shi, Tokyo, Fumio Nozaki, Takasaki-shi, and Shinzo Omi, Ohta-ku, Tokyo, Japan, assignors to Japan Atomic Energy Research Institute, Tokyo, Japan
No Drawing. Filed Oct. 24, 1966, Ser. No. 588,770
Int. Cl. B01j 1/10
U.S. Cl. 204—159.12                                5 Claims

ABSTRACT OF THE DISCLOSURE

The radiation graft polymerization of a monomeric vinyl compound to a cellulose fiber in an emulsified system, the improvement which consists of incorporating a sol of a catalyst material consisting of alumina and alumina silica compositions which act to retard the formation of homopolymer.

---

This invention relates to a catalyst which catalyzes radiation graft polymerization of cellulose fibers and vinyl compounds, and that controls formation of a homopolymer as undesirable by-product.

More particularly, the invention relates to a method of radiation graft polymerization of vinyl compounds onto cellulose in which alumina or alumina-silica mixture is used as the catalyst that maintains a practicable reaction rate, and yet minimizes formation of the homopolymer of said vinyl compounds.

Heretofore, in the graft polymerization of vinyl compounds, the emulsification polymerization technique has been preferred, since this method can maintain a greater reaction rate than other methods such as the solution method, and the reaction system has high resistance against polymerization inhibitors, say, oxygen. However, this method has a shortcoming in that the homopolymer is easily formed and thus efficiency of utilization of monomer is very low.

When a cellulose which has been irradiated is contacted with a vinyl compound (e.g., ethyl acrylate) in an emulsified system at 30–80° C. for graft polymerization, the efficiency of utilization of monomer is usually less than 50%, and a large quantity of homopolymer is formed.

This formation of undesirable homopolymer not only lowers efficiency in utilization of the monomer reactant, but involves trouble in separating the formed homo polymer from the finished product.

The cause of formation of such a homopolymer is believed to be as follows.

When a cellulose is irradiated by an ionizing radiation in the air, diperoxide and hydroxide are formed in the molecule of the cellulose, and when the irradiated cellulose is contacted with a vinyl monomer after the air is removed, and is heated the peroxy radical and oxy radical which are formed from the peroxides initiate graft polymerization. The following equations illustrate the mechanism of the graft polymerization, in which PH stands for a cellulose molecule, and H stands for hydrogen; B means a monomer to be grafted.

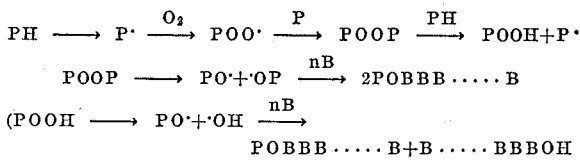

$$POOP \longrightarrow PO{\cdot}+{\cdot}OP \xrightarrow{nB} 2POBBB \cdots B$$

$$(POOH \longrightarrow PO{\cdot}+{\cdot}OH \xrightarrow{nB}$$

$$POBBB \cdots B+B \cdots BBBOH$$

and thus there is formed a homopolymer in the form of B . . . BBBOH caused by ·OH which has been produced by decomposition of said peroxide.

From the above explanation, it is readily understood that it will be necessary to control formation of ·OH radicals or to deactivate the formed ·OH radicals. Generally this is achieved by maintaining the temperature of the polymerization reaction very low or irradiating the cellulose in vacuum. The latter method is not practical. Therefore, if a suitable catalyst is found that prevents formation of ·OH or deactivates the formed trigger radicals, it will be a great achievement.

In order to control formation of homopolymer, many workers searched for catalysts suitable for this purpose, and for the solution polymerization a method in which a small amount of oxygen is dissolved in a reaction system (French Patent 1,157,006) and use of ferrous or ferric ions (Japanese patent publication No. 11,984/61) have been known in this technical field.

The present inventors have searched for catalysts which deactivate ·OH radicals in the graft polymerization of cellulose pre-irradiated in the air with a vinyl monomer in emulsified system on the basis of the following theoretical study.

There are two ways of deactivating the ·OH radicals.
(1) Deactivation by an electron donor, that is:

·OH+(electron donor)→OH⁻+·(electron donor)

whereby, the newly formed radical of the electron donor should not act as a radical initiator.

(2) Deactivation by electron acceptor, that is:

The inventors first took up the catalysts of the second category. As catalysts belonging to the second category, alumina gel and alumina-silica gel are throught of. They have activated sites to accept electrons in their molecular structure, where ·OH is adsorbed as a ligand and deactivated.

On the basis of the above speculation, we checked the effect of alumina sol and silica-alumina sol as catalysts for this purpose, and found that they are very effective.

Now the invention is illustrated in detail by typical examples of the experiments made by the inventors.

Preparation of alumina-silica sol catalyst mixture.

Sixteen (16) ml. of alumina sol (a product denominated #200 manufactured by Nissan Kagaku KK equivalent to Baymol of Du Pont, containing 10% alumina and small amount of acetic acid as a stabilizer) was diluted with 120 ml. of water, to which 8 ml. of silica sol (a product denominated Snowtex O manufactured by Nissan Kagaku KK and equivalent to Ludox of Du Pont, containing 20% silica and small amount of mineral acid as a stabilizer) was added under constant stirring. The mixture was heated at about 50° C. to be gelled. The formed gel was a jelly-like lump. The lump was cut into pieces and was washed with each 200 ml. of methanol several times by decantation so that the contained acid might be removed. After washing, the gel was dispersed again in an amount of methanol so that the concentration of alumina-silica ($Al_2O_3+SiO_2$) might be $1.2\times10^{-4}$ moles per milliliter. The ratio of alumina to silica in this catalyst mixture is 50:50. In this state, alumina has activity as catalyst for the intended purpose.

The catalyst mixtures of various alumina/silica ratio as shown in Table 0 including 100% alumina were prepared in the same way.

TABLE 0

| Denomination: | Alumina/silica ratio |
|---|---|
| AS–0 | 0:100 |
| AS–10 | 9.1:90.9 |
| AS–20 | 20:80 |
| AS–30 | 33.3:66.7 |
| AS–50 | 50:50 |
| AS–60 | 58.9:41.1 |
| AS–70 | 71.5:28.5 |
| AS–100 | 100:0 |

Concentration $1.2\times10^{-4}$ moles/l.

Using the thus prepared alumina-silica sol preparation, the following experiments were carried out.

EXPERIMENT 1

A commercially available styrene was washed with a 10% aqueous sodium hydroxied solution (twice as much volume as that of styrene to be treated) and water in order to fully remove the contained polymerization inhibitor, and was purified by distillation at 40 mm. Hg. The purified styrene was kept in a refrigerator until immediately before the experiment.

Twenty (20) ml. of the purified styrene was mixed with 180 ml. of water and 1 ml. of an emulsifier, polyoxyethylene sorbitan monolaurate (Nonion LT–221 of Nippon Oils and Fats Co., which is an equivalent to Tween 20 of Atlas Powder Co. Its HLB is 16.7. To this emulsion, the above mentioned alumina-silica sol preparation was added so that the alumina concentration in the emulsion might be as specified in Table 1. The mixture was homogenized by a homogenizer which rotated at 1000–2000 r.p.m.

In order to remove oxygen, this emulsion was bubbled with 99.999% pure nitrogen for 25 minutes. There was no troublesome foaming.

About 1 gram of polynosic rayon, which has been moistened to the extent of 12.5% moisture, is put in a polyethylene bag, and irradiated in the presence of air at a dose rate $3.05\times10^5$ rad./sec. and up to the total dose of $3\times10^6$ rad. by the electron beams from a 2 mev. resonance electron beam generator manufactured by General Electric Co. at room temperature.

The above prepared emulsion was put in an evacuated vessel together with the irradiated polynosic rayon. The vessel was kept in a thermostatic container kept at 50° C. during which the grafting reaction proceeded.

The reason why a large amount of emulsion was used in comparison with the amount of the treated rayon is that a large quantity of heat evolves during grafting reaction.

Atfer one hour the rayon was taken out, and was washed with water and benzene, and further the rayon was washed by benzene using a Soxlet extractor so that any homopolymer formed might be removed. After the benzene extraction, the rayon was washed with methanol and dried at 80° C. for 24 hours. In this state the rayon was almost absolutely dry. By weighing the rayon, grafting ratio was calculated. The homopolymer was also collected by the usual method and weighed.

The same experiment was repeated with respect to various alumina/silica rates and the result is shown in Table 1.

TABLE 1

| Catalyst | | A Weight of polynosic rayon before grafting (gm.) | B Weight of polynosic rayon after grafting (gm.) | C Weight of styrene homo-polymer (gm.) | D Percentage of grafting, percent | E Efficiency in utilization of styrene, percent |
|---|---|---|---|---|---|---|
| Alumina-silica sol preparation | Concentration ($Al_2O_3+SiO_2$ moles per liter emulsion) | | | | | |
| AS–0 | $4.0\times10^{-3}$ | 1.0330 | 1.2235 | 7.360 | 35.5 | 4.2 |
| AS–10 | $2.1\times10^{-3}$ | 0.9997 | 1.5560 | 8.959 | 55.0 | 5.1 |
| AS–20 | $2.1\times10^{-3}$ | 1.0962 | 1.7415 | 4.068 | 81.9 | 16.2 |
| AS–30 | $2.1\times10^{-3}$ | 1.01822 | 1.8325 | 5.852 | 106.1 | 13.9 |
| AS–50 | $2.1\times10^{-3}$ | 1.0127 | 1.9615 | 2.108 | 122 | 33.8 |
| AS–70 | $2.1\times10^{-3}$ | 0.9834 | 1.5810 | 0.2880 | 84.0 | 71.5 |
| AS–100 | $2.1\times10^{-3}$ | 1.0243 | 1.4700 | 0.385 | 64.0 | 59.8 |
| No Catalyst | | 1.0545 | 1.3440 | 1.075 | 43.6 | 27.7 |

A: Including 12.5% moisture.
B: Weight in dried state.
C: Weight in dried state.
$D=\frac{B-A(1-0.125)}{A(1-0.125)}\times100$.
$E=\frac{B-A(1-0.125)}{B-A(1-0.125)+C}\times100$.

TABLE 2

| Catalyst | | A Weight of polynosic rayon before grafting (gm.) | B Weight of polynosic rayon after grafting (gm.) | C Weight of styrene homo-polymer (gm.) | D Percent-age of grafting (percent) | E Efficiency of utilization of styrene (percent) |
|---|---|---|---|---|---|---|
| Alumina-silica gel preparation | Alumina-silica conc. in emulsion (moles/l.) | | | | | |
| AS–100: | | | | | | |
| 1 | (0.00) | 1.0545 | 1.3440 | 1.075 | 43.6 | 27.7 |
| 2 | $1.3\times10^{-5}$ | 1.0983 | 1.3702 | 0.502 | 52.4 | 45.5 |
| 3 | $2.3\times10^{-4}$ | 1.0179 | 1.4117 | 0.507 | 58.5 | 50.6 |
| 4 | $8.7\times10^{-4}$ | 0.9987 | 1.4270 | 0.376 | 63.2 | 59.5 |
| 5 | $2.1\times10^{-3}$ | 1.0243 | 1.4700 | 0.385 | 64.0 | 59.8 |
| 6 | $9.0\times10^{-3}$ | 1.0098 | 1.4231 | 0.352 | 61.0 | 60.4 |
| AS–70: | | | | | | |
| 1 | $5.3\times10^{-6}$ | 1.0213 | 1.3353 | 0.818 | 49.3 | 35.0 |
| 2 | $1.7\times10^{-5}$ | 1.0115 | 1.3910 | 0.426 | 56.9 | 54.2 |
| 3 | $2.3\times10^{-4}$ | 1.1003 | 1.6891 | 0.332 | 80.0 | 65.5 |
| 4 | $8.8\times10^{-4}$ | 1.0053 | 1.5748 | 0.287 | 79.1 | 70.8 |
| 5 | $2.1\times10^{-3}$ | 0.9834 | 1.5810 | 0.288 | 84.0 | 71.5 |
| 6 | $9.0\times10^{-3}$ | 0.9959 | 1.6152 | 0.305 | 85.2 | 70.9 |

The result of Experiment 1 shows that alumina sol is effective as well as alumina-silica sol, and the adlumina/silica ratio of which is greater than 50:50, especially about 70:30 was most effective.

EXPERIMENT 2

With respect to the AS-100 and AS-70 sol preparation, influence of catalyst concentration in the emulsion of styrene monomer was checked. Conditions of the experiment were quite the same as in Experiment 1.

The result is shown in Table 2.

The table shows that effective range of catalyst concentration is $10^{-4}$ mole $-5 \times 10^{-3}$ mole/l. and the preferable concentration is around $10^{-3}$ mole/l.

EXPERIMENT 3

Using alumina-silica (70:30) sol (AS-70 in Table 0), the same experiment as Experiment 1 was carried out with respect to polynosic rayon and vinyl acetate monomer.

Vinyl acetate was purified in the same way as in Experiment 1, and made into 250 ml. of an emulsion containing:

5% vinyl acetate 0.8% Nissan Nonion NS-215 (Polyoxyethylene alkyl phenol ether manufactured by Nippon Oils and Fats Co., HLB of which is 15, equivalent to Triton X-100 of Rohm & Haas), to which the alumina-silica (70:30) sol (AS-70) was added so that alumina-silica concentration in the emulsion might be as specified in Table 3.

About 1 gm. of polynosic rayon containing 12.5% moisture was exposed to $1 \times 10^6$ rad. electron beam radiation from the same source, and was contacted with said emulsion in an evacuated vessel. The result is shown in Table 3.

TABLE 3

| Catalyst (Alumina-silica 70:30) Content | A Weight of polynosic rayon before grafting (gm.) | B Weight of polynosic rayon after grafting (gm.) | C Weight of formed vinyl acetate homo-polymer (gm.) | D Percentage of grafting (percent) | E Efficiency of utilization of monomer (percent) |
|---|---|---|---|---|---|
| $4.8 \times 10^{-4}$ | 1.1115 | 1.8778 | 0.210 | 91.5 | 81 |
| $9.8 \times 10^{-4}$ | 1.1263 | 1.7856 | 0.160 | 79.7 | 83 |
| $2.4 \times 10^{-3}$ | 1.1526 | 1.7638 | 0.010 | 73.5 | 99 |
| No catalyst | 1.0271 | 1.9675 | 1.06 | 117.0 | 23 |

EXPERIMENT 4

The same experiment as Experiment 1 was carried out by means of gamma ray from cobalt-60 this time.

Styrene emulsion of the same composition as in Experiment 1 containing $2.4 \times 10^{-3}$ moles/l. of alumina-silica (60:40) sol preparation (AS-60 in Table 0) were prepared except that as an emulsifier Nonion S-15.4 (Polyoxyethylene stearate manufactured by Nippon Oils and Fats Co., HLB of which is 16.7, equivalent to Mirj of Atlas Powder Company) was used instead of Nonion LT-221.

Polynosic rayon the moisture of which was adjusted to 11.0% was put into a polyethylene bag and was exposed to irradiation of gamma-ray from cobalt-60. The dose rate was $1 \times 10^6$/hour and the total dose was $3 \times 10^6$ roentgen.

The result is shown in Table 4.

TABLE 4

| Gel preparation | Catalyst Content | A Weight of polynosic rayon before grafting (gm.) | B Weight of polynosic rayon after grafting (gm.) | C Weight of formed acrylate homo-polymer (gm.) | D Percentage of grafting (percent) | E Efficiency of utilization of monomer (percent) |
|---|---|---|---|---|---|---|
| AS-60 | $2.4 \times 10^{-3}$ | 1.0035 | 1.5144 | 0.123 | 69.8 | 75 |
| No catalyst | | 1.1045 | 1.6750 | 1.905 | 70.5 | 28 |

EXPERIMENT 5

Styrene was grafted to natural cotton and high tenacity rayon fibers in the same way as in Experiment 1, by means of alumina/silica (60:40) catalyst. The conditions and result are shown in Table 5.

TABLE 5

| Fiber | Catalyst Preparation | Content | A Weight of fiber before grafting (gm.) | B Weight of fiber after grafting (gm.) | C Weight of formed styrene homo-polymer (gm.) | D Percentage of grafting (percent) | E Efficiency of utilization of monomer (percent) |
|---|---|---|---|---|---|---|---|
| Natural cotton | AS-60 | $5.4 \times 10$ | 1.0423 | 1.5610 | 0.101 | 58.0 | 85 |
| | No catalyst | | 1.0049 | 1.4902 | 1.611 | 56.7 | 25 |
| High tenacity rayon | AS-60 | $5.3 \times 10^{-4}$ | 1.1002 | 1.4945 | 0.131 | 49.0 | 79 |
| | No catalyst | | 0.9763 | 1.2437 | 1.335 | 39.9 | 21 |

EXPERIMENT 6

Butyl acrylate was grafted to polynosic rayon in a pilot plant.

Butyl acrylate emulsion was prepared by mixing the following materials:

| | Liters |
|---|---|
| Purified butyl acrylate | 55 |
| Nissan nonion LT-221 | 5 |
| SA-65 alumina-silica sol preparation | 4 |
| Purified water | 1036 |
| Total | 1100 |

The AS-65 alumina-silica sol preparation was prepared as described before and its actual alumina/silica ratio was 65.8:34.2 and it contained $1.0 \times 10^{-4}$ moles alumina-silica/ml. The alumina-silica content of the above prepared emulsion was $4.0 \times 10^{-4}$ moles/l. Oxygen was removed by nitrogen bubbling for 30 minutes at flow rate of 10–20 l./min.

Fifteen (15) kgs. of polynosic rayon, the moisture of which had been adjusted to 11.0% was divided into 30 portions, each portion was put in a small cage and about 1 gram thereof was weighed accurately.

All the rayon was irradiated with electron beams produced by the same electron beam generator as used in Experiments 1, 2, 3 and 5 in the air up to the total radiation dose of 1.0 M rad.

After irradiation, the portions (cages) of the rayon were placed on suspended shelves, two or three on each shelf. And all the shelves were suspended within a 1 m.³ reaction vessel. The air in the headspace of the vessel was completely replaced with pure nitrogen by repeating evacuation and nitrogen filling three times.

After 1.5 hour, the charge was taken out and the rayon was separated from the reaction mixture, and dried and weighed as in the previous experiments.

TABLE 6

| Shelf | Portion No. | Weight of polynosic rayon before grafting (gr) | Weight of polynosic rayon after grafting (gr) | Percentage of grafting (percent) | Average |
|---|---|---|---|---|---|
| 1 (Lowermost) | 1 | 0.9036 | 1.2049 | (33.3) | |
| | 2 | 0.9391 | 1.6448 | 75.1 | 68.1 |
| | 3 | 0.8537 | 1.4356 | 68.2 | |
| 2 | 4 | 0.9318 | 1.5568 | 67.1 | |
| | 5 | 0.8662 | 1.4032 | 62.0 | |
| 3 | 6 | 0.8784 | 1.4768 | 68.1 | |
| | 7 | 0.9427 | 1.4446 | 53.2 | 62.2 |
| | 8 | 0.9147 | 1.5155 | 65.7 | |
| 4 | 9 | 0.9122 | 1.4794 | 62.2 | |
| | 10 | 0.9029 | 1.5496 | 71.6 | |
| 5 | 11 | 0.8710 | 1.4558 | 67.1 | |
| | 12 | 0.8893 | 1.3867 | 55.9 | 65.2 |
| | 13 | 0.8737 | 1.4720 | 68.5 | |
| 6 | 14 | 0.8741 | 1.4903 | 70.5 | |
| | 15 | 0.8795 | 1.4892 | 69.3 | |
| | 16 | 0.8762 | 1.3927 | 58.9 | |
| 7 | 17 | 0.8819 | 1.4220 | 61.2 | |
| | 18 | 0.9252 | 1.6095 | 74.0 | 66.7 |
| | 19 | 0.9645 | 1.6577 | 71.9 | |
| 8 | 20 | 0.8914 | 1.4922 | 67.4 | |
| | 21 | 0.8589 | 1.4189 | 65.2 | |
| 9 | 22 | 0.9373 | 1.5128 | 61.4 | |
| | 23 | 0.9158 | 1.5517 | 69.4 | 66.4 |
| 10 | 24 | 0.9084 | 1.5538 | 71.0 | |
| | 25 | 0.8839 | 1.4584 | 65.0 | |
| | 26 | 0.8866 | 1.4182 | 60.0 | |
| 11 | 27 | 0.8663 | 1.4478 | 67.2 | |
| | 28 | 0.9106 | 1.4940 | 64.1 | 58.5 |
| 12 (Uppermost) | 29 | 0.8757 | 1.3234 | 51.1 | |
| | 30 | 0.9092 | 1.3637 | 50.0 | |
| Average | | | | | 64.5 |

The result is shown in Table 6.

Average grafting _____ 64.5%.
Variation in grafting _____ As shown in the table.
Total amount of formed
  homopolymer _____ 2.87 kg.
Total amount of grafted
  butyl acrylate _____ 9.7 kg. (=15 kg.×0.645).
Efficiency in utilization _____ 77.2%.
Standard deviation in grafting percentage _____ Less than 7%.

As has been observed, the catalyst of this invention effectively minimizes formation of the undesirable homopolymer and maintains a practicable reaction rate.

It is an established fact that this kind of graft polymerization reaction is promoted by an ionizing radiation. It must be understood that any ionizing radiation can be applied to the method of this invention.

As to radiation dose, also it is known that at least about 1 M rad. is necessary to generate sufficient radicals to maintain a practicable reaction rate, but application of a dose as much as 5 M rad. results in spoiling the irradiated fiber. It is regarded that the range 1–3 M rad. is sufficient and safe.

All six experiments were carried out at 50° C. It is known that at temperatures below about 30° C. the rate of this kind of reaction is too low whereas at temperatures higher than about 70° C. once-formed trigger radicals are easily inactivated and consequently the reaction is slowed down.

Pressurization of reaction system is not necessary nor desirable. Reaction can be carried out in an inert gas atmosphere or in vacuo. In the latter case, the head space atmosphere is vapor of a monomer to be grafted. In the foregoing Experiment 6, nitrogen was used to replace the air in the reaction vessel. No doubt any other gas inert in the reaction system can be employed.

As to the emulsification of the reaction system, selection of suitable surfactants will be made by any person skilled in this art. Nonionic surfactants are compatible in the reaction system.

In the foregoing experiments, polynosic rayon, high tenacity rayon and natural cotton representing cellulose, and styrene, vinyl acetate and butyl acrylate representing vinyl monomers were used. People skilled in the art of this field will understand that the catalyst and the method of this invention is applicable to cellulose fibers and vinyl monomers in general.

Thus describing our invention, we claim:

1. In the radiation graft polymerization of a monomeric vinyl compound to a cellulose fiber in an emulsified system, a method for minimizing formation of homopolymer of said vinyl compound without retarding the grafting reaction per se by incorporating a sol of a catalyst material selected from the group consisting of alumina and alumina silica compositions as a catalyst in the emulsified reaction system.

2. A method as specified in claim 1, in which said catalyst is incorporated in the emulsified reaction system in the concentration of $10^{-4}$–$5\times10^{-3}$ moles/l. of the emulsion.

3. A method as specified in claim 2 in which said catalyst is an alumina-silica composition containing more than 50% alumina by weight.

4. A method as specified in claim 2 in which said catalyst is an alumina-silica mixture containing 70% alumina and 30% silica1 weight.

5. A method as specified in claim 1, in which said cellulose is one selected from the group consisting of polynosic rayon, natural cotton and high tenacity rayon, and said vinyl compound is one selected from the group consisting of styrene, vinyl acetate and butyl acrylate.

No references cited.

MURRAY TILLMAN, Primary Examiner

R. B. TURER, Assistant Examiner

U.S. Cl. X.R.

260—17.4